(12) United States Patent
Bedwani

(10) Patent No.: US 7,165,195 B2
(45) Date of Patent: Jan. 16, 2007

(54) METHOD, SYSTEM, AND APPARATUS FOR BIT ERROR CAPTURE AND ANALYSIS FOR SERIAL INTERFACES

(75) Inventor: Serge Bedwani, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 651 days.

(21) Appl. No.: 10/641,613

(22) Filed: Aug. 15, 2003

(65) Prior Publication Data

US 2005/0055619 A1   Mar. 10, 2005

(51) Int. Cl.
G06F 11/00    (2006.01)

(52) U.S. Cl. .................. 714/704; 714/761; 714/765

(58) Field of Classification Search .................. 714/42, 714/30, 720, 704, 761, 765; 375/356; 713/503
See application file for complete search history.

(56) References Cited

U.S. PATENT DOCUMENTS

| 4,342,084 | A | * | 7/1982 | Sager et al. ................... 714/42 |
| 5,615,335 | A | * | 3/1997 | Onffroy et al. ............... 714/30 |
| 5,832,047 | A | * | 11/1998 | Ferraiolo et al. ............ 375/356 |
| 6,185,693 | B1 | * | 2/2001 | Garmire et al. ............. 713/503 |
| 6,754,858 | B1 | * | 6/2004 | Borkenhagen et al. ...... 714/720 |

* cited by examiner

*Primary Examiner*—David Ton
(74) *Attorney, Agent, or Firm*—Michael J. Nesheiwat

(57) ABSTRACT

An apparatus and method to facilitate validation and/or test of serial interfaces by analyzing error event types based at least in part on a code-stamp, compare engine logic and a memory for error capture.

26 Claims, 4 Drawing Sheets

METHOD, SYSTEM, AND APPARATUS FOR BIT ERROR CAPTURE AND ANALYSIS FOR SERIAL INTERFACES

FIELD OF THE INVENTION

The present invention pertains to the field of test, evaluation, and analysis methods suited to high speed serial interfaces. More specifically, the invention describes a method, system, and apparatus for Bit Error Capture, and Analysis, in high speed serial interface communication circuits. Likewise, the present invention is applicable to a number of different standards, such as Serial ATA, Serial Attached SCSI, FibreChannel, Infiniband, XAUI, and PCI Express.

BACKGROUND OF THE INVENTION

With the advent of increasing serial interface bit-rates, the need for the development of high-speed Data Recovery Circuits (DRC) has become more and more prevalent. Very high-frequency phase-locked loops (PLLs), picosecond-jitter specifications, high jitter tolerance DRC specifications, plesiochronous/isochronous interfaces, spread-spectrum clocking, as well as low-voltage signaling environments accommodating shrinking transistor geometries have made DRC design very complex. Evaluation of newly developed DRC architectures and implementations has become more difficult and, in some cases impossible, using some of the presently available Bit-Error-Rate Tester (BERT) Equipment. Data-rate performance limitations, signaling electricals, but more importantly, the limited error-event, and error-recovery diagnostics were found to be inadequate for test, performance analysis, and evaluation of new and existing high-speed serial interface DRCs, especially across the various interface media.

Testing high-speed serial interfaces is difficult, the various circuit components making up the front-end receiver, and its respective data recovery circuits, are prone to various types of intermittent errors. Various elements in the serial interface communications interface, such as transmitter signal PLL-jitter, rise/fall time mismatch, interface media insertion loss and reflections, may cause signal distortions and jitter-events beyond the jitter-tolerance threshold of the Data Recovery Circuits (DRC), resulting in Bit errors. Conversely, other errors may result from physical environmental sources, such as, power-supply events, substrate-noise events, and electromagnetic interference (EMI) events. Bit errors may occur as a single-error, or may occur as a Burst-error event, consisting of a sustained sequence of errors. Thus, existing techniques merely count bit/burst errors and are insufficient for capturing and analyzing characteristics of the error-event in order to quickly validate and test high speed serial interfaces.

BRIEF DESCRIPTION OF THE SEVERAL VIEWS OF THE DRAWINGS

The present invention will be understood more fully from the detailed description given below and from the accompanying drawings of the embodiments of the invention which, however, should not be taken to limit the invention to the specific embodiments described, but are for explanation and understanding only. Like references indicate similar elements, in which.

DETAILED DESCRIPTION OF THE INVENTION

The present invention pertains to the field of test, evaluation, and analysis methods suited to high speed serial interfaces. More specifically, the invention describes a method, system, and apparatus for Bit Error Capture, and Analysis, in high speed serial interface communication circuits.

An area of current technological development relates to improving bit-error analysis, and design validation for communication products, and computer or computing systems, by devising a method and apparatus that ensures that the manner in which the data being transmitted or received, has sufficient accompanying diagnostic data, where the characteristics of the various error-events can be captured, and effectively analyzed. As previously described, testers merely count the number of bit-errors or burst-errors, and fail to distinguish between the error type, such as, a burst-error or bit errors. it is not sufficient to merely count the bit/burst errors, but it is necessary to capture and analyze the characteristics of that error-event, and its respective recovery back to error-free operation Thus, improper error type classification may increase test times and/or result in improper design validation of data recovery circuits (DRC), serial interface circuits, and testers. In contrast, the claimed subject matter facilitates proper classification of error types and errors by utilizing a novel architecture comprising error capture logic and compare logic with code stamps to properly identify error types. Furthermore, the novel architecture utilizes a random access memory (RAM)/Register array or a linear feedback shift register to serve as the source of expected data for comparing against the actual received data.

In one embodiment, the novel architecture is incorporated into the receiving circuitry as well as the transmission circuitry Typically, an Rx-Jitter model is created based on various error sources that were previously described. Various data samples are input to a data recovery circuit algorithm that produces an output of RX data. The claimed subject matter analyzes and captures various errors existing within the RX data.

Figure 1:
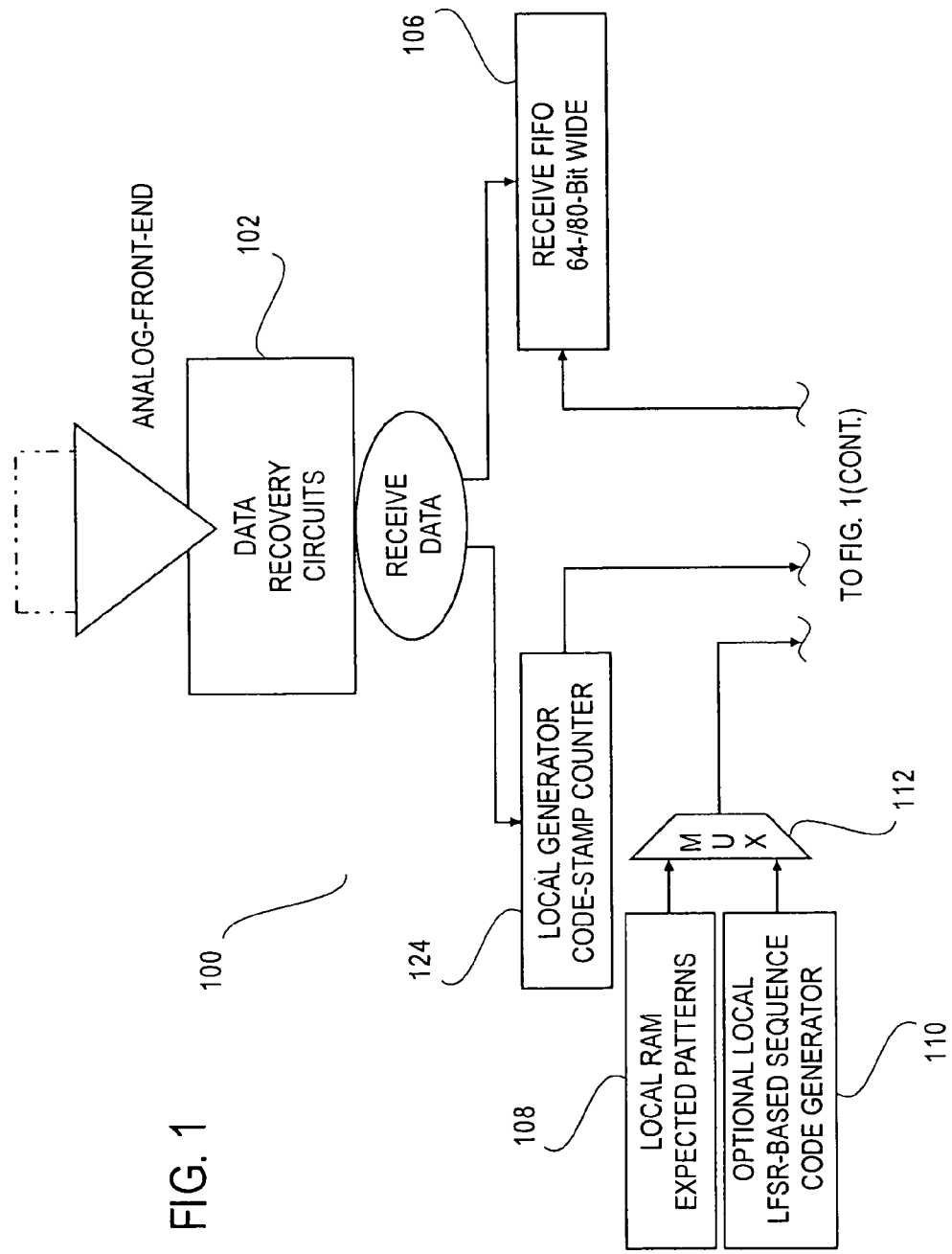
FIG. 1 illustrates a block diagram utilized by an embodiment of the present invention.
Figure 1:
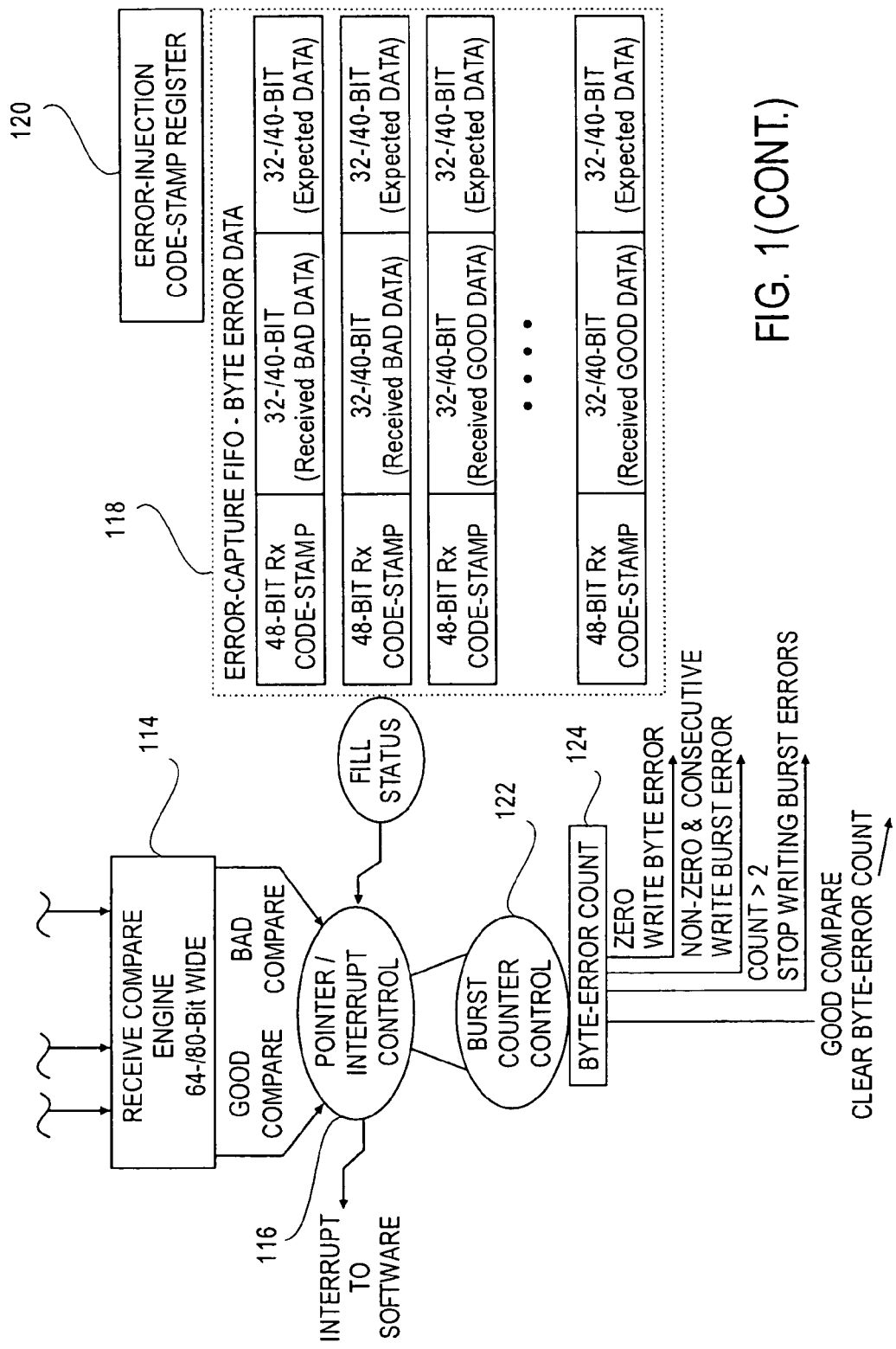

FIG. 1 illustrates a block diagram 100 utilized by an embodiment of the present invention. The block diagram describes a novel architecture to facilitate analysis of error types and error sources of Rx data.

Figure 2:
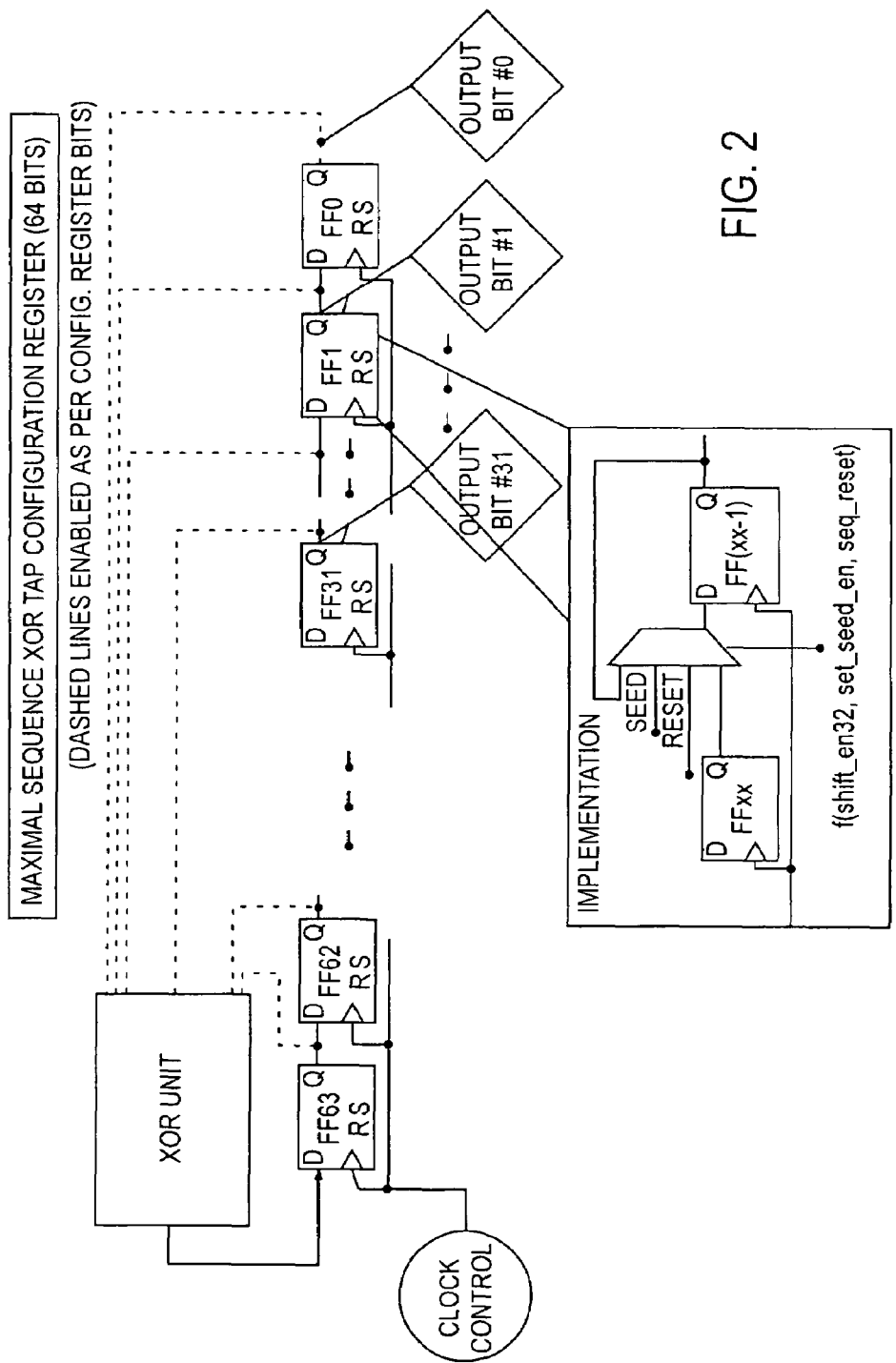
FIG. 2 illustrates a block diagram utilized by an embodiment of the present invention.

The block diagram 100 comprises at least one data recovery circuit (DRC) 102, a code-stamp counter 104 and a receive memory 106 coupled to the data recovery circuit, a compare logic 114 coupled to a multiplexer 112 that receives expected data patterns from either a local random access memory 108 or from a linear feedback shift register 110, which is discussed further in connection with FIG. 2. Also, the block diagram comprises a pointer interrupt control 116 coupled to a error capture memory 118 and a burst counter control 122 and byte-error count 124.

In one embodiment, the receive memory 106 and error capture memory is a first in first out (FIFO) memory. In one embodiment, the DRC 102 receives the data from an analog front end interface.

In one embodiment, the block diagram 100 is loaded with a predetermined pattern type. For example, the predetermined pattern type is a worst case data pattern, such as, a pattern with High-InterSymbol Interference that has a pattern of long-runlengths followed by a short runlength. In this same embodiment, the predetermined pattern type excludes any synchronization alignment unique words that are utilized for testing. Typically, a periodic unique-word or unique-sequence is utilized for facilitating re-alignment of parallel-word transfers. In this context, a word is defined as a parallel-grouping of bits, such as, 8/10 bits, 16/22 bits, 32/40 bits, etc. This type of bit grouping will be further referred to as a PWORD that may be defined per application.

As previously described, the block diagram receives a data pattern from a transmitting source. In one embodiment, the transmitted data pattern is code stamped at the transmit source and the received data pattern is also code stamped within the block diagram by the code stamp counter 104 and is captured and assembled into single/double PWORD entries, which will be eventually compared to the expected data that has been stored in a local RAM memory within block 100 by the compare logic 104.

As long as the compare operation is successful (no mismatches between expected data and received data), the received data continues to be processed through the block diagram 100 (flow through) and the Transmitted (Tx) and Received (Rx) code stamps are updated accordingly. In an alternative embodiment, a latching Code stamp circuit to allow application software to display the received data on a computer screen and performs bit error rate (BER) performance statistics.

Otherwise, if there is a mismatch between expected data and received data, designated as a "miscompare event", an entry is created and stored in the error capture memory 118. For example, in one embodiment, the entry comprises the expected data, the received data and the code stamp of the received data. Furthermore, upon the existence of another consecutive code-stamped miscompare event, another entry is created and stored consecutively in the error capture memory 118. However, subsequent miscompare events will not result in another entry in the error capture memory. Rather, an entry is created and stored in the error capture memory for a successful comparison (no mismatch/miscompare event), which will be designated as a "Good Compare" operation for a Recovery event.

In contrast to a Burst-Error Event a single error event that recovers on the next compare operation results in only one entry in the error capture memory.

Upon the creation of entries in the error capture memory 118, the duration of the Burst-Error Event and the Recovery may be analyzed. For example, the type of error that caused the Burst-Error event may be determined. For example, some errors may result in de-synchronization between the receiving and transmitting source. This error may be detected because of a disparity between received and transmitted code stamp values, or a long burst-error time, or the absence of a recovery event code-stamp entry in the error capture memory. Thus, in one embodiment, a programmable threshold is set for a burst-error time. If the burst-error time is exceeded, which is probably due to a de-synchronization error, application software initiates a restart operation to re-synchronize the receiving and transmitting source.

FIG. 2 illustrates a block diagram utilized by an embodiment of the present invention. As previously discussed in connection with FIG. 1, the compare logic 114 is coupled to the multiplexer 112 that receives expected data patterns from either the local random access memory 108 or from the linear feedback shift register 110. Thus, FIG. 2 depicts one embodiment of the linear feedback shift register (LFSR) that is utilized in accordance with the apparatus discussed in FIG. 1. In one embodiment, the LFSR is utilized for either transmission or compare operations. LFSRs are well known in the art and generate a periodic sequence of pseudo random data that is used to test transmission paths between circuits. Likewise, the circuits may be synchronized to the transmitted test data after being provided with a seed value corresponding to a transmitted data word.

Figure 3:
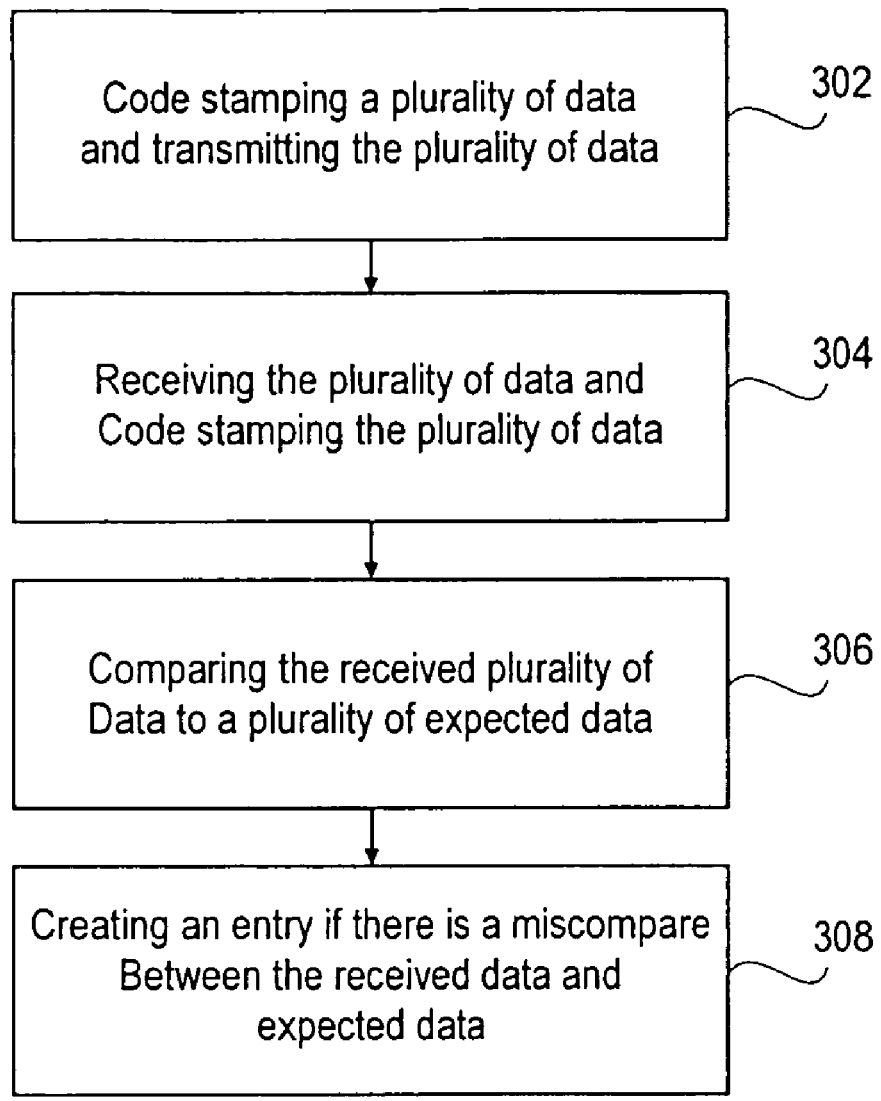
FIG. 3 illustrates a flowchart method utilized by an embodiment of the present invention.

FIG. 3 depicts a flowchart of a method in accordance with an embodiment. As depicted in block 302, a transmitting source code stamps a plurality of data and transmits the plurality of data to a receiving source. At the receiving source, the plurality of data is code stamped, as depicted in block 304. Subsequently, the received data is compared to a plurality of expected data, as depicted in block 306. In the event of a miscompare, an entry is created, as depicted in block 308. The creation of the entry was discussed in detail in connection with FIG. 1.

While the invention has been described with reference to specific modes and embodiments, for ease of explanation and understanding, those skilled in the art will appreciate that the invention is not necessarily limited to the particular features shown herein, and that the invention may be practiced in a variety of ways that fall under the scope and spirit of this disclosure. The invention is, therefore, to be afforded the fullest allowable scope of the claims that follow.

The invention claimed is:

1. A method for testing comprising:
    code stamping a plurality of data and transmitting the plurality of data;
    receiving the plurality of data and code stamping the plurality of data;
    comparing the received plurality of data to a plurality of expected data; and
    creating an entry if there is a miscompare between the received data and expected data.

2. The method of claim 1 wherein the transmitting or receiving of the plurality of data is via a serial interface.

3. The method of claim 1 wherein the plurality of expected data is stored in a random access memory or a linear feedback shift register.

4. The method of claim 1 wherein the entry comprises the code stamp of the plurality of data that was received and the plurality of expected data and the received plurality of data.

5. An apparatus comprising
    a compare logic;
    at least one data recovery circuit and a code stamp counter coupled to the compare logic; and
    a memory to store a plurality of expected data, coupled to the error capture and the compare logic, the apparatus to compare the plurality of expected data to a plurality of received data that is received by the data recovery circuit and to create a first entry in the event of a first miscompare.

6. The apparatus of claim 5 wherein the code stamp counter is to code stamp the plurality of received data.

7. The apparatus of claim 6 wherein the entry comprises the code stamp of the plurality of received data, the plurality of expected data, and the plurality of received data.

8. The apparatus of claim 5 wherein the apparatus is a serial interface.

9. The apparatus of claim 5 wherein the plurality of expected data is stored in a random access memory or a linear feedback shift register.

10. The apparatus of claim 9 wherein the compare logic is to receive the plurality of expected data from either the random access memory or the linear feedback shift register via a multiplexer.

11. The apparatus of claim 9 wherein the compare logic is to receive the plurality of received data from a receive first in first out (FIFO) memory.

12. The apparatus of claim 5 wherein the memory is to create a second entry in the event of a second miscompare.

13. The apparatus of claim 12 wherein the second entry is stored consecutively with the first entry in the memory.

14. The apparatus of claim 13 wherein subsequent miscompare events do not result in an entry being created in memory, but a third entry is created in memory for a successful comparision.

15. An apparatus comprising
a compare logic;
a code stamp counter coupled to the compare logic; and
a memory to store a plurality of expected data, coupled to the compare logic, the apparatus to compare the plurality of expected data to a plurality of received data that is received by the apparatus and to create:
  a first entry in the memory in the event of a first miscompare between the plurality of expected data and the plurality of received data;
  a second entry in the memory, consecutive to the first entry, based at least in type on a type of error event.

16. The apparatus of claim 15 wherein the code stamp counter is to code stamp the plurality of received data.

17. The apparatus of claim 15 wherein the apparatus is a serial interface.

18. The apparatus of claim 15 wherein the first entry comprises the code stamp of the plurality of received data, the plurality of expected data, and the plurality of received data.

19. The apparatus of claim 15 wherein the plurality of expected data is stored in a random access memory or a linear feedback shift register.

20. The apparatus of claim 19 wherein the compare logic is to receive the plurality of expected data from either the random access memory or the linear feedback shift register via a multiplexer.

21. The apparatus of claim 19 wherein the compare logic is to receive the plurality of received data from a receive first in first out (FIFO) memory.

22. The apparatus of claim 15 wherein the memory is to create a second entry in the event of a second miscompare for a burst-error event type.

23. The apparatus of claim 22 wherein the second entry is stored consecutively with the first entry in the memory.

24. The apparatus of claim 23 wherein subsequent miscompare events do not result in an entry being created in memory, but a third entry is created in memory for a successful comparision.

25. The apparatus of claim 15 wherein the memory is to create a second entry in the absence of a miscompare event of a for a single-error event type.

26. The apparatus of claim 25 wherein the second entry is stored consecutively with the first entry in the memory.

* * * * *